US005120770A

United States Patent [19]
Doyle et al.

[11] Patent Number: 5,120,770
[45] Date of Patent: Jun. 9, 1992

[54] USE OF LIQUID CARBON DIOXIDE AS A BLOWING AGENT IN THE PRODUCTION OF OPEN-CELL POLYURETHANE FOAM

[76] Inventors: Earl N. Doyle, 6333 Dixie Dr., Houston, Tex. 77087; Scott Carson, 22 Monte Vista, Woodland, Calif. 95695

[21] Appl. No.: 442,645

[22] Filed: Nov. 29, 1989

[51] Int. Cl.$^5$ ............................................. C08G 18/14
[52] U.S. Cl. ........................... 521/99; 521/110; 521/112; 521/129; 521/131; 521/133
[58] Field of Search ............... 521/99, 110, 112, 129, 521/131, 133

[56] References Cited

U.S. PATENT DOCUMENTS

| | | | |
|---|---|---|---|
| 3,882,052 | 5/1975 | Raynor et al. | 521/133 |
| 4,337,318 | 6/1982 | Doyle | 521/80 |
| 4,945,119 | 7/1990 | Smits et al. | 521/131 |

*Primary Examiner*—Maurice J. Welsh
*Attorney, Agent, or Firm*—Burns, Doane, Swecker & Mathis

[57] ABSTRACT

A process for the production of an open cell polyurethane foam comprises the mixing of the following components at ambient temperatures in a mixing zone: a diisocyanate having a functionality of at least about 2.0, at least one hydrogen donor, at least one surfactant which is effective in forming an open cell polyurethane foam, at least one catalyst, and a blowing agent comprising a gas having a boiling point below approximately $-100°$ F. at atmospheric pressure which preferably comprises carbon dioxide. In addition, the mixture may also optionally contain water. The mixture is subjected to a pressure in said mixing zone which is sufficient to maintain the blowing agent in the liquid state at ambient temperatures. After mixing, the mixture is ejected from the mixing zone to atmospheric pressure, thereby completely and instantaneously vaporizing the blowing agent to provide expansion of the mixture. The resultant foam is then cured at ambient temperatures.

41 Claims, No Drawings

USE OF LIQUID CARBON DIOXIDE AS A BLOWING AGENT IN THE PRODUCTION OF OPEN-CELL POLYURETHANE FOAM

BACKGROUND OF THE INVENTION

The present invention relates to a process for the production of open cell polyurethane foams.

Open cell foams have been utilized as a means for providing soft cushioning in a variety of applications in the automotive and furniture industries. In addition, these foams have been frequently employed within toys, athletic equipment, filters and sponges.

Such open cell polyurethane foams have traditionally been comprised of at least one polyol, an isocyanate, water, one or more surfactants, at least two catalysts which include a metallic catalyst as well as a tertiary amine catalyst, and, optionally, a blowing agent.

The blowing agent is employed in order to enhance the expansion of the foam which is obtained from the reaction of the water with the isocyanate. Traditionally, these blowing agents include chlorofluorocarbons such as Freon 11 or 12 and/or low boiling solvents such as methylene chloride.

However, certain problems associated with the use of chlorofluorocarbons, particularly environmental and public health problems, have led to the creation of an international agreement to reduce and eventually eliminate the use of these materials. Moreover, several states have already banned the use of methylene chloride due to health hazards which have been associated with its use. Thus, the art has been forced to look for alternative blowing agents.

One example of such a blowing agent has been liquid carbon dioxide as disclosed in U.S. Pat. Nos. 3,184,419 and 4,337,318.

U.S. Pat. No. 3,184,419 to Merriman, relates to a method for the production of polyurethane foam material. The method comprises the incorporation of a soluble inert gas under pressure in the liquified state into a liquid composition containing a prepolymer and a compound capable of reacting therewith to form a polyurethane foam composition. The carbon dioxide is introduced at a temperature below that which a substantial reaction between the prepolymer and the reactive compound takes place. The liquid composition is foamed by reducing the pressure of the mixer and raising the temperature of the foam to convert the composition to an elastomer.

Because this process requires the use of a prepolymer in the production of the foam, it can not be economically employed for large scale production. Moreover, this patent process requires cooling of the inert gas to aid in maintaining it in a liquid state which also adds to the expense of this procedure.

Doyle U.S. Pat. No. 4,337,318 relates to a "one shot process" for the production of a rigid, closed cell polyurethane foam utilizing liquid $CO_2$ as a blowing agent. However, the closed cell foam differs greatly from the open cell foam of the present invention with respect to the compounds chosen for the isocyanates, polyols, cell forming surfactants, and the catalysts. For example, rigid foams are made with relatively high functionality isocyanates and polyols, while open cell foams, particularly flexible open cell foams, are made with low functionality isocyanates and high molecular weight polyols which can include both diols and triols.

Accordingly, the need still exists for a process for producing an open cell polyurethane foam which is free of traditional, hazardous blowing agents.

Thus, it is an object of the present invention to provide a blowing agent which does not have the environmental and health hazards associated with methylene chloride and chlorofluorocarbons.

It is a further object of the present invention to provide a process for the production of open cell polyurethane foam utilizing such blowing agent.

These and further objects will become apparent from the specification and claims which follow.

SUMMARY OF THE INVENTION

In accordance with the foregoing objectives, the present invention relates to a process for the production of an open cell polyurethane foam.

In particular, the process of the present invention comprises:

(a) mixing the following components at ambient temperatures in a mixing zone,
  (i) a diisocyanate having a functionality of at least about 2.0,
  (ii) at least one hydrogen donor,
  (iii) at least one surfactant which is effective in forming an open cell polyurethane foam,
  (iv) at least one catalyst, and
  (v) a blowing agent comprising a gas having a boiling point below approximately $-100°$ F. at atmospheric pressure, the mixture being subjected to a pressure in said mixing zone which is sufficient to maintain said blowing agent in the liquid state at ambient temperatures, said mixture being substantially free of water;

(b) ejecting said mixture from said mixing zone to atmospheric pressure, thereby completely and instantaneously vaporizing said blowing agent to provide substantially total expansion of said mixture, and (c) curing the resultant foam at ambient temperatures.

In another embodiment, the present invention comprises a process for the production of an open cell polyurethane foam with varying degrees of post expansion comprising:

(a) mixing in a mixing zone the following components at ambient temperatures;
  (i) a diisocyanate having a functionality of at least about 2.0,
  (ii) at least one hydrogen donor,
  (iii) at least one surfactant which is effective in forming an open cell polyurethane foam,
  (iv) at least one catalyst,
  (v) a blowing agent comprising a gas having a boiling point below approximately $-100°$ F. at atmospheric pressure, and
  (vi) water, the mixture being subjected to a pressure in said mixing zone which is sufficient to maintain said blowing agent in the liquid state at ambient temperatures;

(b) ejecting said mixture from said mixing zone to atmospheric pressure, (c) curing the resultant foam at ambient temperatures.

DETAILED DESCRIPTION OF THE PREFERRED EMBODIMENTS

The present invention relates to a process for the production of open cell polyurethane foam, preferably a flexible, open cell foam, in which all or part of either the traditional blowing agents such as chlorofluorocarbons and methylene chloride, or the water can be replaced with a gas in the liquid state which has a boiling point below −100° F. at atmospheric pressure, such as liquid $CO_2$.

The use of a system employing at least two components (including a foaming agent) to form a polyurethane foam is, of course, well known in the art as described in literature, for example, in "The Development and Use of Polyurethane Products", E. N. Doyle, McGraw-Hill Book Co. (1971), cited hereafter as Doyle.

While many of the constituents of the composition used in the present invention are known per se, the components are formulated and used in a manner, in particular, the addition of liquid $CO_2$ to substitute for the chlorofluorocarbons, methylene chloride, as well as all or part of the water which was heretofore unrecognized in the manufacture of an open cell foam.

In particular, the present invention relates to a multi-component system for the production of an open cell foam, preferably a flexible, open cell foam. Although flexible foams are preferred, the present invention can also produce semi-rigid or rigid foams.

A first component comprises a diisocyanate having a functionality of at least about 2.0. Preferably, this diisocyanate comprises a straight diisocyanate such as toluene diisocyanate (TDI) with a functionality of about 2.0, a diphenylmethane diisocyanate (MDI) having a functionality within the range of about 2.0 to about 2.7, or mixtures thereof.

The diisocyanates are conventional compounds in that the choice of the particular diisocyanate may vary accordingly to the specific properties desired in the polyurethane in a manner understood by the skilled artisan.

In addition to these pure diisocyanates, this first component could also comprise an NCO-terminated prepolymer which are well known in the art (see, for example, Doyle, pages 29–43) and which comprise a mixture of a diisocyanate, such as TDI, with a hydrogen donor to yield an NCO-terminated prepolymer which can range in free NCO from about 2.5 to about 45 percent and which will react with the remainder of the hydrogen donor in a second component to form the polyurethane.

The second component comprises a hydrogen donor necessary to react with the first component in order to form the polyurethane. A single hydrogen donor or a mixture of hydrogen donors may be utilized. Again, the hydrogen donors are conventional in that choice of a particular hydrogen donor may be determined by the skilled artisan to achieve the particular properties desired.

The hydrogen donors which can be utilized in the present invention preferably have a functionality of about 2 to about 4. Such hydrogen donors include polyols, for example, diols and triols, having a molecular weight of about 500 to about 6500. More specifically, such donors include polyether polyols having a molecular weight of about 500 to about 6500, such as polytetramethylether glycol, and polyester polyols having a molecular weight of about 500 to about 3800, such as caprolactam-based esters and adipate and succinate polyster polyols.

For the production of flexible, open cell foams, the use of polyols having a molecular weight range of about 2000 to about 6500 is particularly preferred.

In addition, small amounts of lower molecular weight triols, and quadrols may be employed with the preferred hydrogen donors in order to provide slightly stiffer, more firmer foams. These additives may be amino-based polyols or polyols such as trimetholyl propane, or pentaerythritol.

Moreover, other reactive materials, such as dimethylol urea and dimethylol melamine may be employed to achieve increased flame-retardance, as well as increased stiffness.

When choosing a polyol it is recognized in the art that the use of longer chain, high molecular weight polyols provide a final product having increased softness while the use of shorter chain, low molecular weight polyols or those polyols having a higher functionality provide more stiffness within the final product.

Another component comprises the catalyst. The catalyst can be any suitable urethane polymerization catalyst. However, a combination of at least two catalytic materials is preferred. Such a combination preferably includes at least one metallic catalyst, such as, for example, tin or lead octoates as well as at least one tertiary amine catalyst (see also, Doyle, pages 64–67).

The catalysts are each preferably present in an amount which is less than about 1 part by weight of catalyst to about 100 parts of hydrogen donor.

A surfactant is also one of the components in the present invention. The surfactants preferably employed comprise silicone based surfactants, fatty acid esters, phosphate-based esters and certain highly aromatic derivatives with the silicone-based surfactants being most preferred.

The type and the size of the cell structures can be influenced by the choice of type and the amount of the surfactant. The surfactant is preferably present in an amount of at least about 1 part by weight of surfactant to about 100 parts of hydrogen donor.

The blowing agent is another component employed in the present invention. The blowing agents which can be utilized within the present invention can comprise any suitable substance which is in the gaseous state at atmospheric pressure and which has a boiling point below approximately −100° F. The gas is preferably non-toxic, non-flammable, and non-reacting with the urethane reactants.

Such gases include carbon dioxide, nitrogen, helium, tetrafluoromethane (freon 14), fluoroform (freon 23), hexafluoroethane (freon 116), chlorotrifluoromethane (freon 13), and mixtures thereof such as a mixture of fluoroform and chlorotrifluoromethane (freon 503).

The preferred blowing agent is carbon dioxide which is very inexpensive in comparison to the other suitable blowing agents and which provides large volume of gas per gram of liquid, thereby requiring the use of less carbon dioxide than other gases for a given density foam.

In a specially preferred embodiment, the liquid carbon dioxide is present in an amount greater than about 3 percent by volume, preferably about 3 to about 40 percent by volume, more preferably about 10 to about 25 percent based on the total volume of the first component, the second component, and the blowing agent.

In addition, the composition can also optionally contain water. When water is employed, it performs two basic functions; (1) to react with the diisocyanate to provide gaseous $CO_2$; and (2) to provide urea groups which increase certain physical properties of the final product. However, the use of water also increases the cost of the final product since the addition of water to the composition requires the use of a larger amount of diisocyanate.

The use of water within the process of the present invention is also effective in providing for post-expansion of the foam, i.e., the additional expansion of the product after the mixed components exit the mixing zone. The degree of post-expansion of the product can be controlled by the amount of water present within the composition.

Water is generally present in an amount of about 0 to about 4 percent by weight of the total formula, with about 1 to about 2 percent being more preferred.

In those situations which water is not employed, other agents can be used in small amounts to provide a controlled slight degree of post expansion. Such agents are know in the art and preferably include higher boiling point solvents such as methylene chloride, methyl chloride, ethyl chloride, chloroform, chlorofluorocarbons such as Freon 11; hydrochlorofluorocarbons such as Freon 21, Freon 22, Freon 113, Freon 114, 1,1-difluoroethane, 1,1-chlorodifluoroethane; chemical blowing agents such as azodicarbonamides; and non-halogenated hydrocarbons such as hexane, heptane, and the like.

According to the process of the present invention, each of the components are mixed together in a mixing zone. The individual components are provided to the mixing zone in the liquid state, and the mixture is subjected in the mixing zone to a pressure sufficient to maintain the blowing agent in the liquid state at ambient temperature. Commonly, the pressure within the mixing zone is about 300 to about 5000 psi while the temperature is at ambient temperature, i.e., about 70° to about 100° F. Although it is recognized that some of the components (i.e., high molecular weight polyols) are in a solid phase at these temperature, and thus, require heating to a temperature on the order of 150° F. for processing.

In one embodiment, each of the components is separately introduced into the mixing zone. For example, each of the components can be introduced as a separate stream into a mixing chamber. Moreover, any means which is recognized in the art, such as a variable speed pump, can be employed to separately control the flow of each of the components into the mixing chamber in order to provide the desired product, i.e., the catalyst can be controlled according to operating conditions such as temperature, and humidity while the surfactant level can be adjusted so as to provide the desired cell structure.

In an alternative embodiment, one or more of the components can be premixed prior to introduction into the mixing zone. In a particularly preferred arrangement, the blowing agent can be introduced into one or more of the other components at a point prior to the mixing zone. For example, with the use of certain diisocynate/hydrogen donor combinations, compatibility can be improved through premixing.

Although the process of the present invention is effective in providing a polyurethane foam having a wide range of properties, the cured polyurethane foam preferably has a density of about 0.75 to about 12 lbs./ft.$^3$. Moreover, the specific amounts of each of the individual components introduced into the mixing zone depends on the desired foam product. For example, to produce a foam having the above density, a ratio of diisocynate to hydrogen donor of 1:1 to 1:25 is preferred.

After the mixture has been formed in the mixing zone, the mixture is then ejected from the mixing zone to atmospheric pressure so as to completely and instantaneously vaporize the blowing agent.

In those situations where water or another post expansion agent is not included in the composition, this ejection provides for the total expansion of the mixture. The large pressure drop exiting from the mixing zone, where the carbon dioxide or other blowing agent is maintained in the liquid state, to atmospheric pressure causes the complete and instantaneous vaporization of the carbon dioxide or other blowing agent. It is this complete and instantaneous vaporization which prevents post-expansion of the polyurethane foam by totally and completely expanding the mixture at the time of the pressure drop.

In those situations where water or another post expansion agent is provided, a carefully controlled degree of post-expansion can be provided depending upon the amount of water or other post-expansion agent in the system. Accordingly, by careful choice of the formulation, the present invention can be effective in providing control of both the pre- and (if desired) post-expansion of the open cell foam.

In each situation, the foam resulting from the expansion is then cured at room temperature. In addition, the formulation may be also contain other known additives such as flame retardants, fillers, pigments and the like.

In order to further illustrate the present invention and the advantages which can be associated therewith, the following specific examples are given, it being understood that the same are intended only as illustrative and in nowise limitive.

EXAMPLES

Each of the compositions of the following examples refer to parts by weight, unless otherwise noted.

EXAMPLE I 1. 3000 mol wt triol: 100 parts
2. water: 4
3. Surfactant: 1.0
4. tertiary amine catalyst: 0.2
5. Metallic catalyst: 0.2
6. TDI: 50.0
7. Liquid $CO_2$: 12.0

The above formulation would yield an open-cell flexible foam of approximately 1 lb. per cu. ft. density. Each of the 7 components would normally be proportioned as a separate stream, however, components 1, 2, and 3 could be introduced as a single stream. This foam would be approximately 60% post-expansion.

EXAMPLE II 1. 3000 mol wt triol: 100 parts
2. 700 mol wt triol: 48
3. water: 2
4. Surfactant: 1
5. tertiary amine catalyst: 0.2
6. tertiary amine co-catalyst: 0.2
7. Metallic catalyst: 0.2
8. TDI: 45.6
9. Liquid $CO_2$: 19.0

As was the case with Example I, each component can be pumped to the mixing head as a separate stream, or components 1 and 2 could be pre-blended or components 1, 2, 3 and 4 could be pre-blended. This foam would have approximately 35% post-expansion.

EXAMPLE III 1. 3000 mol wt triol: 100 parts
2. water: 1
3. surfactant: 1
4. tertiary amine catalyst: 0.25
5. metallic catalyst: 0.25
6. TDI: 18.25
7. Liquid $CO_2$: 26

Each component may be introduced separately, or certain ingredients may be pre-blended. This foam would have approximately 15% post expansion.

EXAMPLE IV 1. 3000 mol wt triol: 100 parts
2. Quadrol (amino polyol): 7.2
3. surfactant: 1.0
4. tertiary amine catalyst: 0.2
5. metallic catalyst: 0.2
6. TDI: 18.25
7. $CO_2$: 35 parts This formula would be an example of a foam with no post-expansion, when the ingredients are provided to the mixing chamber at proper pressures.

It will be obvious to those skilled in the art that such formulas can be varied into thousands of possible combinations in polyols, surfactants, catalysts, and diisocyanates without departing from the intent of the present invention.

As can be readily seen, the higher amount of water present, the higher percentage of post-expansion is obtained, and without water in the formulation, little to no post-expansion is experienced.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims including equivalents thereof.

We claim:

1. A process for the production of an open-cell polyurethane foam in the absence of any substantial post-expansion, said process comprising:
   (a) mixing the following components at ambient temperatures in a mixing zone,
      (i) a diisocyanate having a functionality of about 2.0 to about 2.7,
      (ii) at least one hydrogen donor having a functionality of about 2 to about 4 and which is at least one polyol having a molecular weight of about 2000 to about 6500,
      (iii) at least one surfactant which is effective in forming an open-cell polyurethane foam,
      (iv) at least one catalyst, and
      (v) a blowing agent comprising a gas having a boiling point below approximately −100° F. at atmospheric pressure, the mixture being subjected to a pressure in said mixing zone which is sufficient to maintain said blowing agent in the liquid state at ambient temperatures, said mixture being substantially free of water;
   (b) ejecting said mixture from said mixing zone to atmospheric pressure, thereby completely and instantaneously vaporizing said blowing agent to provide substantially total expansion of said mixture, and
   (c) curing the resultant foam at ambient temperatures.

2. The process of claim 1 whereby the blowing agent is selected from among carbon dioxide, nitrogen, helium, tetrafluoroethylene, fluoroform, hexafluoroethane, or mixtures thereof.

3. The process of claim 1 wherein said blowing agent is carbon dioxide.

4. The process of claim 1 wherein said mixture is subjected in said mixing zone to a pressure of about 300 to about 500 psi.

5. The process of claim 1 wherein said cured polyurethane foam has a density of about 0.75 to about 12 pounds per cubic feet.

6. The process of claim 1 wherein each of the components is separately metered into said mixing zone.

7. The process of claim 1 wherein said diisocyanate and said hydrogen donor are provided in a weight ratio of about 1:1 to about 1:25.

8. The process of claim 3 wherein said mixtures in said mixing zone comprise greater than about 3 percent by volume of said carbon dioxide in the liquid state.

9. The process of claim 8 wherein said mixture in said mixing zone comprises about 3 to about 40 percent by volume of said carbon dioxide in the liquid state.

10. The process according to claim 8 wherein the mixture in said mixing zone comprises about 10 to about 25 percent by volume of the carbon dioxide in liquid state.

11. The process of claim 1 wherein the catalyst is at least one tertiary amine catalyst.

12. The process of claim 1 wherein the catalyst is at least one metallic catalyst.

13. The process according to claim 1 wherein the diisocyanate comprises a pure diisocyanate or a prepolymer having desired-NCO percentage.

14. The process of claim 1 wherein the surfactant is selected from among a silicone polymer, a diester, or mixtures thereof.

15. The process according to claim 1 wherein at least two of the components are pre-mixed prior to introduction into the mixing zone.

16. The process according to claim 1 further including an additional higher boiling point solvent which introduces a controlled minor amount of post expansion into the foam.

17. The process according to claim 16 wherein the higher boiling point solvent is selected from among methylene chloride, methyl chloride, ethyl chloride, chloroform, chlorofluorocarbons, hydrochlorofluorocarbons, azodicarbonamides, hexane, heptane, or mixtures thereof.

18. The process according to claim 1 wherein at least a portion of the blowing agent is mixed with one or more of the other components at a point prior to the mixing zone.

19. The process of claim 1 wherein said blowing agent comprises carbon dioxide, and said diisocynate and said hydrogen donor being provided in a weight ratio of about 1:1 to about 1:25.

20. The process of claim 19 wherein at least a portion of the carbon dioxide blowing agent is mixed with one or more of the other components at a point prior to the mixing zone.

21. A process for the production of an open-cell polyurethane foam with varying degrees of post expansion comprising:

(a) mixing in a mixing zone the following components at ambient temperatures;
  (i) a diisocyanate having a functionality of about 2.0 to about 2.7,
  (ii) at least one hydrogen donor having a functionality of about 2 to about 4 and which is at least one polyol having a molecular weight of about 2000 to about 6500,
  (iii) at least one surfactant which is effective in forming an open-cell polyurethane foam,
  (iv) at least one catalyst,
  (v) a blowing agent comprising a gas having a boiling point below approximately $-100°$ F. at atmospheric pressure, and
  (vi) water, the mixture being subjected to a pressure in said mixing zone which is sufficient to maintain said blowing agent in the liquid state at ambient temperatures;
(b) ejecting said mixture from said mixing zone to atmospheric pressure, and
(c) curing the resultant foam at ambient temperatures.

22. The process of claim 21 whereby the blowing agent is selected from among carbon dioxide, nitrogen, helium, tetrafluoroethylene, fluoroform, hexafluoroethane, or mixtures thereof.

23. The process of claim 21 wherein said blowing agent is carbon dioxide.

24. The process of claim 21 wherein said mixture is subjected in said mixing zone to a pressure of about 300 to about 5000 psi.

25. The process of claim 21 wherein said polyurethane foam has a density of about 0.75 to about 12 pounds per cubic feet.

26. The process of claim 21 wherein each of the components is separately metered into said mixing zone.

27. The process according to claim 21 wherein at least two of the components are pre-mixed prior to introduction into the mixing zone.

28. The process according to claim 27 wherein at least a portion of the blowing agent is mixed with one or more of the other components at a point prior to the mixing zone.

29. The process of claim 21 wherein said diisocyanate and said hydrogen donor are provided in a weight ratio of about 1:1 to about 1:25.

30. The process of claim 23 wherein said mixtures in said mixing zone comprises greater than about 3 percent by volume of said carbon dioxide in the liquid state.

31. The process of claim 30 wherein said mixture in said mixing zone comprises about 3 to about 40 percent by volume of said carbon dioxide in the liquid state.

32. The process of claim 21 wherein the catalyst is at least one tertiary amine catalyst.

33. The process or claim 21 wherein the catalyst is at least one metallic catalyst.

34. The process according to claim 21 wherein the diisocyanate comprises a pure diisocyanate or a prepolymer having a desired-NCO percentage.

35. The process of claims 21 wherein the surfactant is selected from among a silicone polymer, a diester, or mixtures thereof.

36. The process of claim 21 wherein the water is present in an amount of about 0.25 to about 3 percent by weight of the total formula.

37. The process according to claim 21 further including an additional higher boiling point solvent which introduces a controlled minor amount of post expansion into the foam.

38. The process according to claim 37 wherein the higher boiling point solvent is selected from among methylene chloride, methyl chloride, ethyl chloride, chloroform, chlorofluorocarbons, hydrochlorofluorocarbons, azodicarbonamides, hexane, heptane, or mixtures thereof.

39. The process of claim 21 wherein at least a portion of the carbon dioxide blowing agent is mixed with one or more of the other components at a point prior to the mixing zone.

40. The process of claim 21 wherein said blowing agent comprises carbon dioxide, and said diisocynate and said hydrogen donor being provided in a weight ratio of about 1:1 to about 1:25.

41. The process of claim 40 wherein at least a portion of the carbon dioxide blowing agent is mixed with one or more of the other components at a point prior to the mixing zone.

* * * * *